United States Patent
Rahman

(10) Patent No.: US 12,301,266 B2
(45) Date of Patent: May 13, 2025

(54) INTERFERENCE MITIGATION IN WIRELESS COMMUNICATION USING ARTIFICIAL INTERFERENCE SIGNAL

(71) Applicant: T-Mobile USA, Inc., Bellevue, WA (US)

(72) Inventor: Muhammad Tawhidur Rahman, Bellevue, WA (US)

(73) Assignee: T-Mobile USA, Inc., Bellevue, WA (US)

(*) Notice: Subject to any disclaimer, the term of this patent is extended or adjusted under 35 U.S.C. 154(b) by 14 days.

(21) Appl. No.: 18/311,685

(22) Filed: May 3, 2023

(65) Prior Publication Data

US 2023/0275606 A1    Aug. 31, 2023

Related U.S. Application Data

(63) Continuation of application No. 17/384,619, filed on Jul. 23, 2021, now Pat. No. 11,677,423.

(51) Int. Cl.
*H04B 1/04* (2006.01)
*H04B 17/345* (2015.01)

(52) U.S. Cl.
CPC ......... *H04B 1/0475* (2013.01); *H04B 17/345* (2015.01); *H04B 2001/0425* (2013.01)

(58) Field of Classification Search
CPC .......... H04B 1/02; H04B 1/04; H04B 1/0475; H04B 1/40; H04B 17/00; H04B 17/10; H04B 17/101; H04B 17/15; H04B 17/16; H04B 17/27; H04B 17/309; H04B 17/373; H04B 17/391; H04B 17/1911; H04B 17/3912; H04B 17/3913
See application file for complete search history.

(56) References Cited

U.S. PATENT DOCUMENTS

| | | |
|---|---|---|
| 6,185,256 B1 | 2/2001 | Saito et al. |
| 6,661,835 B1 | 12/2003 | Sugimoto et al. |
| 7,027,533 B2 | 4/2006 | Abe et al. |
| 7,043,242 B2 | 5/2006 | Kuiri et al. |

(Continued)

FOREIGN PATENT DOCUMENTS

| | | |
|---|---|---|
| CN | 1311646 C | 4/2007 |
| CN | 1951058 B | 7/2010 |

(Continued)

*Primary Examiner* — Quochien B Vuong
(74) *Attorney, Agent, or Firm* — Perkins Coie LLP

(57) ABSTRACT

Methods, devices, and system related to wireless communications are disclosed. In one example aspect, a device for wireless communication includes a processor that is configured to determine an estimation of an interference signal for a connection between the device and a receiving device in a wireless communication system, construct an interference elimination signal based on the estimation of the interference signal, and perform a data transmission to the receiving device with the interference elimination signal to enable the receiving device to eliminate the interference signal in the data transmission. The estimation of the interference signal is determined by building a probabilistic model of the interference signal using at least an interference template associate with a characteristic of the device or one or more measurements of a channel condition collected within a predefined observation window.

18 Claims, 5 Drawing Sheets

(56) References Cited

U.S. PATENT DOCUMENTS

| | | |
|---|---|---|
| 7,079,607 B2 | 7/2006 | Brunel |
| 7,088,978 B2 | 8/2006 | Hui et al. |
| 7,136,638 B2 | 11/2006 | Wacker et al. |
| 7,245,679 B2 | 7/2007 | Aoki et al. |
| 7,545,827 B2 | 6/2009 | Tao et al. |
| 7,546,105 B2 * | 6/2009 | Piirainen ............ H04B 17/3912 455/278.1 |
| 7,697,645 B2 * | 4/2010 | Jong ................... H04B 17/345 370/335 |
| 7,733,813 B2 | 6/2010 | Shin et al. |
| 7,782,987 B2 | 8/2010 | Jonsson |
| 7,796,716 B2 | 9/2010 | Bhukania et al. |
| 8,077,627 B2 | 12/2011 | Chang et al. |
| 8,155,046 B2 | 4/2012 | Jung et al. |
| 8,200,484 B2 | 6/2012 | Choi et al. |
| 8,849,210 B2 | 9/2014 | Mese et al. |
| 9,559,874 B2 | 1/2017 | Han et al. |
| 9,602,230 B2 | 3/2017 | Roman et al. |
| 9,748,990 B2 | 8/2017 | Wu et al. |
| 9,912,374 B2 | 3/2018 | Zhang |
| 10,284,313 B2 * | 5/2019 | Abdelmonem ...... H04B 17/336 |
| 10,396,925 B2 | 8/2019 | Wu et al. |
| 10,560,244 B2 | 2/2020 | Jana et al. |
| 11,166,288 B2 | 11/2021 | Abdelmonem et al. |
| 2007/0135051 A1 | 6/2007 | Zheng et al. |
| 2007/0280332 A1 | 12/2007 | Srikanteswara et al. |
| 2010/0080323 A1 | 4/2010 | Mueck et al. |
| 2010/0290552 A1 | 11/2010 | Sasaki |
| 2011/0158211 A1 | 6/2011 | Gaal et al. |
| 2013/0102256 A1 | 4/2013 | Cendrillon et al. |
| 2013/0114468 A1 | 5/2013 | Hui et al. |
| 2013/0188760 A1 | 7/2013 | Subramanian et al. |
| 2021/0153052 A1 | 5/2021 | Taherzadeh Boroujeni et al. |
| 2021/0160713 A1 | 5/2021 | Yang et al. |

FOREIGN PATENT DOCUMENTS

| | | |
|---|---|---|
| CN | 106797223 B | 10/2019 |
| CN | 109274399 B | 3/2020 |
| JP | 2006229503 A | 8/2006 |
| JP | 2006238423 A | 9/2006 |
| JP | 2006287551 A | 10/2006 |
| KR | 20070074708 A | 7/2007 |
| KR | 20080086726 A | 9/2008 |
| WO | 03001742 A1 | 1/2003 |
| WO | 2005114874 A1 | 12/2005 |
| WO | 2007046503 A1 | 4/2007 |
| WO | 2008040088 A1 | 4/2008 |
| WO | 2010151849 A2 | 12/2010 |

* cited by examiner

INTERFERENCE MITIGATION IN WIRELESS COMMUNICATION USING ARTIFICIAL INTERFERENCE SIGNAL

CROSS-REFERENCE TO RELATED APPLICATIONS

This application is a continuation of U.S. patent application Ser. No. 17/384,619, filed on Jul. 23, 2021, entitled INTERFERENCE MITIGATION IN WIRELESS COMMUNICATION USING ARTIFICIAL INTERFERENCE SIGNAL, which is hereby incorporated by reference in its entirety.

BACKGROUND

In telecommunications, an interference refers to the addition of unwanted signals to a useful signal that modifies a signal as it travels along a communication channel between the transmitter and receiver. Multiple types of interference exist in telecommunications, such as inter-symbol interference, inter-carrier interference, and adjacent-channel interference. Interference often affects telecommunications in a disruptive manner.

BRIEF DESCRIPTION OF THE DRAWINGS

Detailed descriptions of implementations of the present invention will be described and explained through the use of the accompanying drawings.

Figure 1:
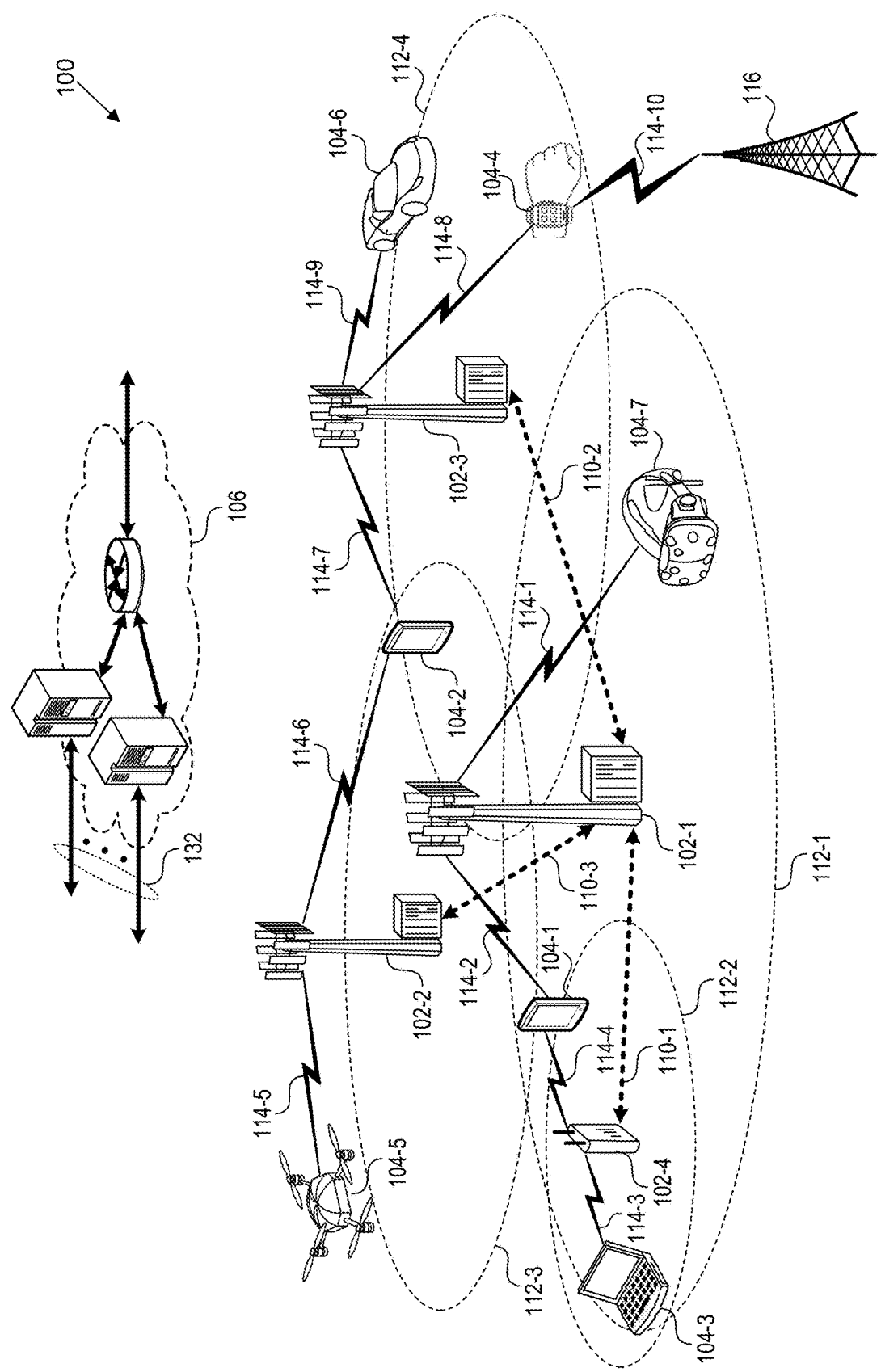
FIG. 1 is a block diagram that illustrates a wireless communications system.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Wireless transmissions are exposed to various channel conditions subject to interference and path loss caused by neighboring cell transmissions, cross-channel interference, fading, obstacles, and various other spurious transmissions. In cellular communications, interference is conventionally addressed by increasing power levels of transmissions and/or allocating more resources in areas that have poor coverages. With the advance of wireless technologies, especially for high-frequency transmissions, there remains a need to improve the handling of interference while conserving power consumption and resource allocation.

This patent document discloses techniques that can be implemented as an interference modeling and mitigation framework applied in various embodiments of wireless communications to estimate the interference signals and transmit interference canceling signals, thereby mitigating the impact of interference signals. The interference modeling and mitigation framework can determine a baseline interference template based on the location of the device and collect measurement results that are representative of the channel or network conditions. A statistical learning model can be used to adapt the baseline interference template based on the measurement results and generate an interference elimination signal that can be applied to minimize or eliminate the actual interference present in the communications.

Wireless Communications System

FIG. 1 is a block diagram that illustrates a wireless telecommunication system 100 ("system 100") in which aspects of the disclosed technology are incorporated. The system 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The system 100 can include any combination of NANs including an access point, radio transceiver, gNodeB (gNB), NodeB, eNodeB (eNB), Home NodeB or eNodeB, or the like. In addition to being a WWAN base station, a NAN can be a WLAN access point, such as an Institute of Electrical and Electronics Engineers (IEEE) 802.11 access point.

The NANs of a network formed by the system 100 also include wireless devices 104-1 through 104-8 (referred to individually as "wireless device 104" or collectively as "wireless devices 104") and a core network 106. The wireless devices 104-1 through 104-8 can correspond to or include network entities capable of communication using various connectivity standards. For example, a 5G communication channel can use millimeter wave (mmW) access frequencies of 28 GHz or more. In some implementations, the wireless device 104 can operatively couple to a base station 102 over a Long-Term Evolution (LTE)/LTE Advanced (LTE-A) communication channel, which is referred to as a 4G communication channel. In some implementations, the base station 102 can provide network access to a Fifth-Generation (5G) communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links 108 (e.g., S1 interfaces) and can perform radio configuration and scheduling for communication with the wireless devices 104 or can operate under the control of a base station controller (not shown). In some examples, the base stations 102 can communicate, either directly or indirectly (e.g., through the core network 106), with each other over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The system 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC)), etc.

The system 100 can include a 5G network and/or an LTE/LTE-A or other network. In an LTE/LTE-A network, the term eNB is used to describe the base stations 102 and in 5G new radio (NR) networks, the term gNBs is used to describe the base stations 102 that can include mmW communications. The system 100 can thus form a heterogeneous network in which different types of base stations provide coverage for various geographical regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices with service subscriptions with a wireless network service provider. As indicated earlier, a small cell is a lower-powered base station, as compared with a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices with service subscriptions with the network provider. A femto cell covers a relatively smaller geographic area (e.g., a home) and can provide restricted access by wireless devices having an association with the femto cell (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

As illustrated, the wireless devices 104 are distributed throughout the system 100, where each wireless device 104 can be stationary or mobile. A wireless device can be referred to as a mobile station, a subscriber station, a mobile unit, a subscriber unit, a wireless unit, a remote unit, a handheld mobile device, a remote device, a mobile subscriber station, an access terminal, a mobile terminal, a wireless terminal, a remote terminal, a handset, a mobile client, a client, or the like. Examples of a wireless device include user equipment (UE) such as a mobile phone, a personal digital assistant (PDA), a wireless modem, a handheld mobile device (e.g., wireless devices 104-1 and 104-2), a tablet computer, a laptop computer (e.g., wireless device 104-3), a wearable (e.g., wireless device 104-4). A wireless device can be included in another device such as, for example, a drone (e.g., wireless device 104-5), a vehicle (e.g., wireless device 104-6), an augmented reality/virtual reality (AR/VR) device such as a head-mounted display device (e.g., wireless device 104-7), an IoT device such as an appliance in a home (e.g., wireless device 104-8), a portable gaming console, or a wirelessly connected sensor that provides data to a remote server over a network.

A wireless device can communicate with various types of base stations and network equipment at the edge of a network including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-11 (also referred to individually as "communication link 114" or collectively as "communication links 114") shown in system 100 include uplink (UL) transmissions from a wireless device 104 to a base station 102, and/or downlink (DL) transmissions, from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using FDD (e.g., using paired spectrum resources) or TDD operation (e.g., using unpaired spectrum resources). In some implementations, the communication links 114 include LTE and/or mmW communication links.

In some implementations of the system 100, the base stations 102 and/or the wireless devices 104 include multiple antennas for employing antenna diversity schemes to improve communication quality and reliability between base stations 102 and wireless devices 104. Additionally, or alternatively, the base stations 102 and/or the wireless devices 104 can employ multiple-input, multiple-output (MIMO) techniques that can take advantage of multi-path environments to transmit multiple spatial layers carrying the same or different coded data.

Interference Modeling

Figure 2:
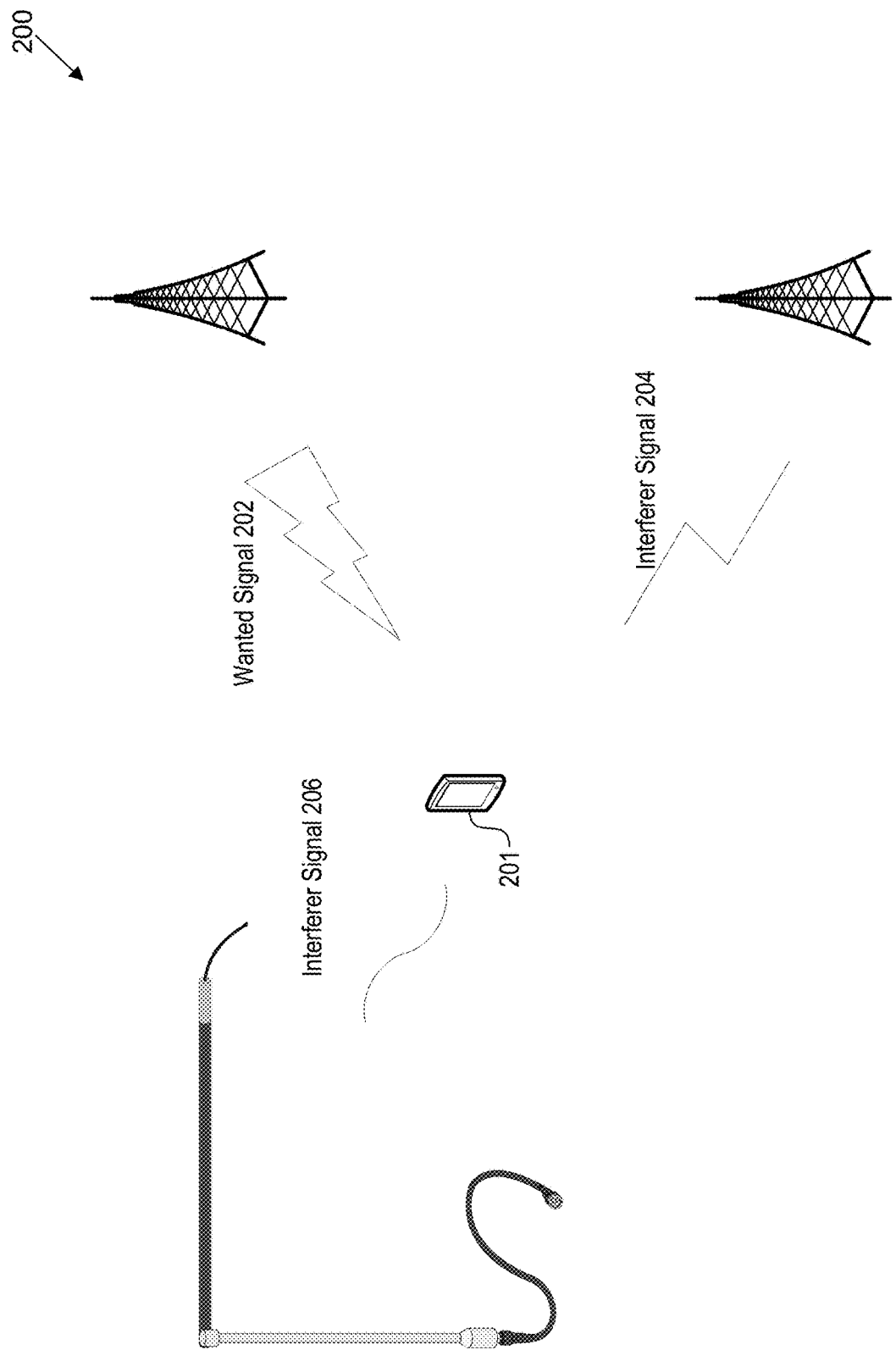
FIG. 2 illustrates an example of inter-cell interference and interference caused by nearby powerlines.

Interference in real world is unpredictable. FIG. 2 illustrates an example of inter-cell interference 204 and interference caused by nearby powerlines 206. Unlike hardware-based interferences (e.g., interferences caused by hardware variations in gateways or backbone devices), which is often modeled as white Gaussian interference, environmental interference does not follow standard probability distributions very well. Furthermore, environmental interference is subject to change. When terminal devices move across different geographical locations or terrains, the associated interference patterns change at the same time. Therefore, static modeling of interference/interference based on standard probability distributions is not sufficient to provide accurate estimation of the real-world interference.

Instead of relying on static characterization of interference and/or interference in wireless communication channels, the inventors have formulated techniques for dynamic modeling of interference based on statistical modeling techniques. For example, an interference modeling and mitigation framework can be implemented to build a non-Gaussian probability distribution based on past observations of channel conditions or interference values. To construct the probability distribution, the interference modeling and mitigation framework can first consider multiple factors, such as the geographical location of a terminal device and/or the operating spectrum of the terminal device.

Signal transmissions can be heavily impacted by the landscape associated with the geographical location of the terminal device or the base station. For example, the topology associated with the geographical location, e.g., whether the device is located in urban centers with lots of buildings, a suburban flat land, or a hilltop with many trees, can introduce different interference in the signal transmissions. Additional factors, such as spurious transmissions from nearby power lines or other types of transmission signals, can also impact the interference presented in the wireless communication signals. The interference modeling and mitigation framework can provide baseline interference templates according to the location, topology, and/or landscape associated with the devices. For example, templates based on geographical locations can be pre-determined based on simulation or real interference data collected in the areas. Geographical topology varies from one location to another. As an example, Seattle area has mountains, lakes and tall trees, while Dallas has a relatively flat terrain. Different terrain characteristics cause different signal propagation patterns. Accordingly, a specific baseline template can be designed for Seattle as compared to Dallas. Once a connection is established between a terminal device and a base station, an appropriate baseline template is selected according to the location of the devices.

The baseline template can also be further adapted dynamically based on the conditions or characteristics of the connection. When the terminal device establishes a communication connection with the base station, it often measures the channel conditions using certain reference signals such that transmission configurations can be adjusted when the channel conditions are suboptimal. For example, in cellular communication systems, such as the Long-Term Evolution (LTE) systems or the New Radio (NR) systems, the terminal device or the base station performs measurements of the channel conditions in the spectrum that it operates on using several reference signals (e.g., channel state information reference signals and/or sounding reference signals). The terminal device also reports the measurements, such as Channel Quality Indicator (CQI), the Precoding Matrix Index (PMI), and Rank Indicator (RI), to the base station so that the base station can adjust transmission configurations if necessary. In some embodiments, in addition to measurements based on existing reference signals, new types of reference signals can be specifically designed to the wireless communication to facilitate the modeling of interference. The measurement results can be used by both the base station and the terminal device to further refine the baseline interference templates. Details regarding refining the baseline interference templates are further discussed below.

In some embodiments, the interference modeling and mitigation framework defines an observation window for collecting the measurement results before providing estimated interference patterns. In the observation window, the interference modeling and mitigation framework collects the measurement results such as the signal-to-interference ratio and/or the received signal strength indicator and adopts statistical modeling techniques to obtain one or more probability distribution functions that represent the dominant interference signals. For example, a probability distribution function that represents the decibel values of the dominant sinusoidal interference signal can be constructed. In case of a continuous random variable, the probability of X in an interval (a, b) can be calculated.

$$P(a<X<b)=\int_a^b f(x) \qquad \text{Eq. (1)}$$

In some embodiments, probabilistic modeling tools, such as the closest pattern matching (CPM) model in which each data value is a probability distribution function of the observed interference values, can be trained based on N previous measurement values observed in the observation window to further refine the baseline interference template. The closest pattern matching (CPM) model performs well in modeling the interference or interference for heavy traffic environments with sufficient number of measurement samples. For low traffic environments, probabilistic modeling tools such as the correlation distortion model can be applied to generate a non-Gaussian random process with an auto-correlation function to transform the non-Gaussian to Gaussian distribution. The correlation distortion method is also suitable for interferences that have long-term correlation (e.g., periodic interferences that have long periodicities).

In some embodiments, the baseline interreference template can include information about characteristic of the traffic flow associated with a particular geographical location, thereby allowing the terminal device or the base station to select appropriate statistical modeling tools to further refine the estimated interference.

A longer observation window having more measurement results can lead to more accurate estimation of the interference patterns. However, long observation windows can also introduce computational complexity, thereby increasing power consumption of the devices. Therefore, an appropriate observation window can be selected based on the computational power of the device to achieve a desirable balance between the accuracy of the interference model and the amount of required power or computation resources. The length of the observation window can also be determined according to vendors and mobile operators' needs on accuracy requirements. For example, longer observation windows lead to better accuracy. However, the overhead can also hurt overall service performance. In some embodiments, the mobile operator or handset manufacturer can extend the observation window length based on the processing load such that no performance loss is incurred. The observation window can be represented in a number of hours, days, weeks, months, quarters, and so on. In some embodiments, an observation window of a week is used for the terminal and base station. In some embodiments, the observation window can be increased to a month for devices that have sufficient computing power.

Interference Mitigation

Figure 3:
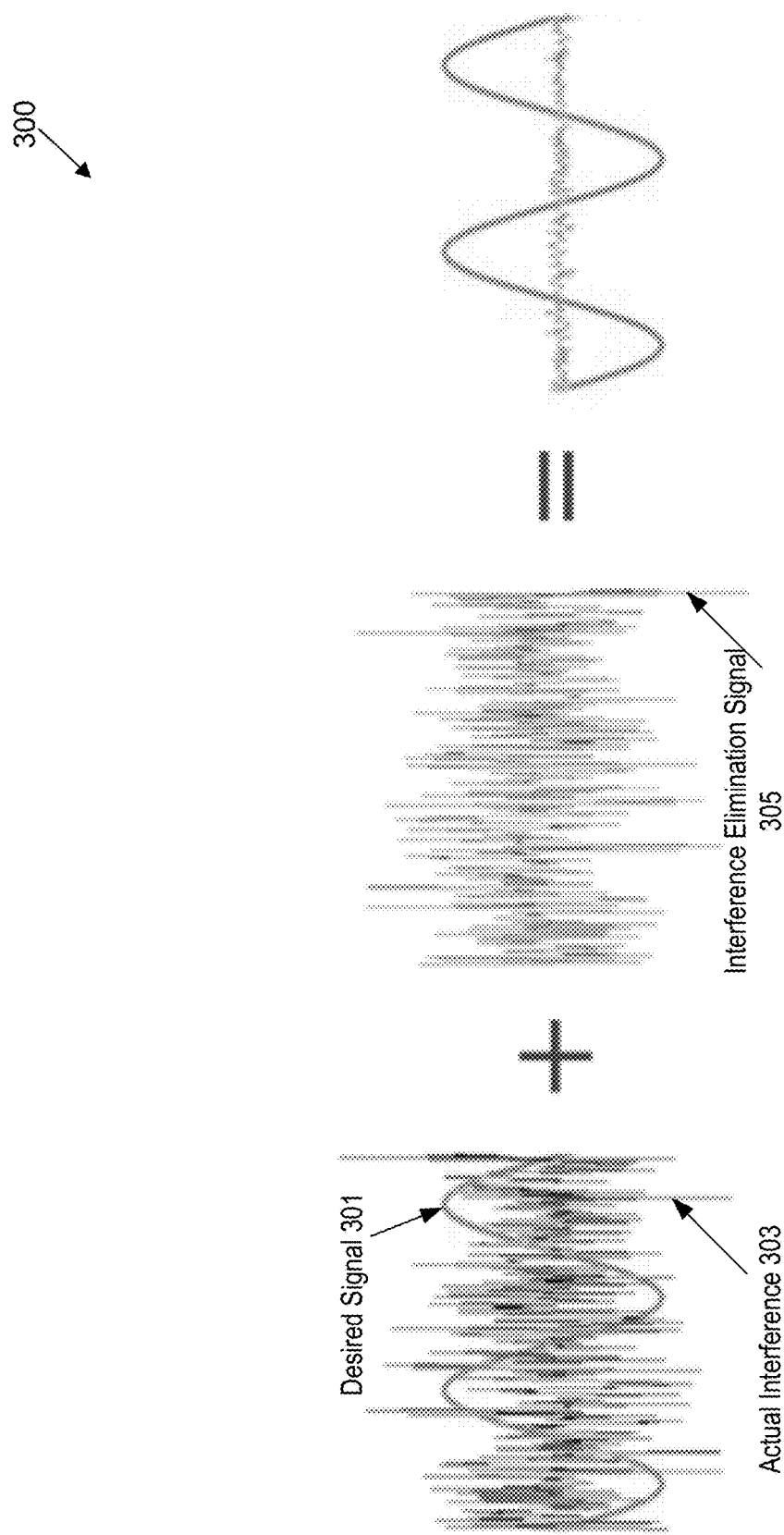
FIG. 3 illustrates an example application of an interference elimination signal in accordance with one or more embodiments of the present technology.

After the probabilistic model is trained based on the channel measurements collected in the observation window, the interference modeling and mitigation framework can use the probability model (e.g., the CPM model, the correlation distortion model, or other probability models) to generate an interference elimination signal. In some embodiments, the interference elimination signal is a signal that has the same amplitude as the estimated interference signal but has an opposite phase (e.g., 180-degree phase shift). As shown in FIG. 3, a desired signal 301 can be interfered with an interference signal 303. After applying the interference elimination signal 305, which has an opposite phase as compared to the estimation generated by the probabilistic model, the actual interference is largely eliminated without the need to change transmit power or adjust allocated transmission resources.

In some embodiments, the receiving end can derive the interference elimination signal based on its own geographical location and/or measurement results and apply the interference elimination signal to incoming transmissions. In some embodiments, the transmitting end can include the interference elimination signal as a non-payload portion of the transmission to enable the receiving end to obtain the desired signal more effectively. For example, the interference elimination signal can be transmitted as a part of the control signal in a control channel that corresponds to the data channel for data transmissions. After receiving the interference elimination signal by the receiving end, the receiving end can apply the interference elimination signal to data transmission on the data channel(s).

Figure 4:
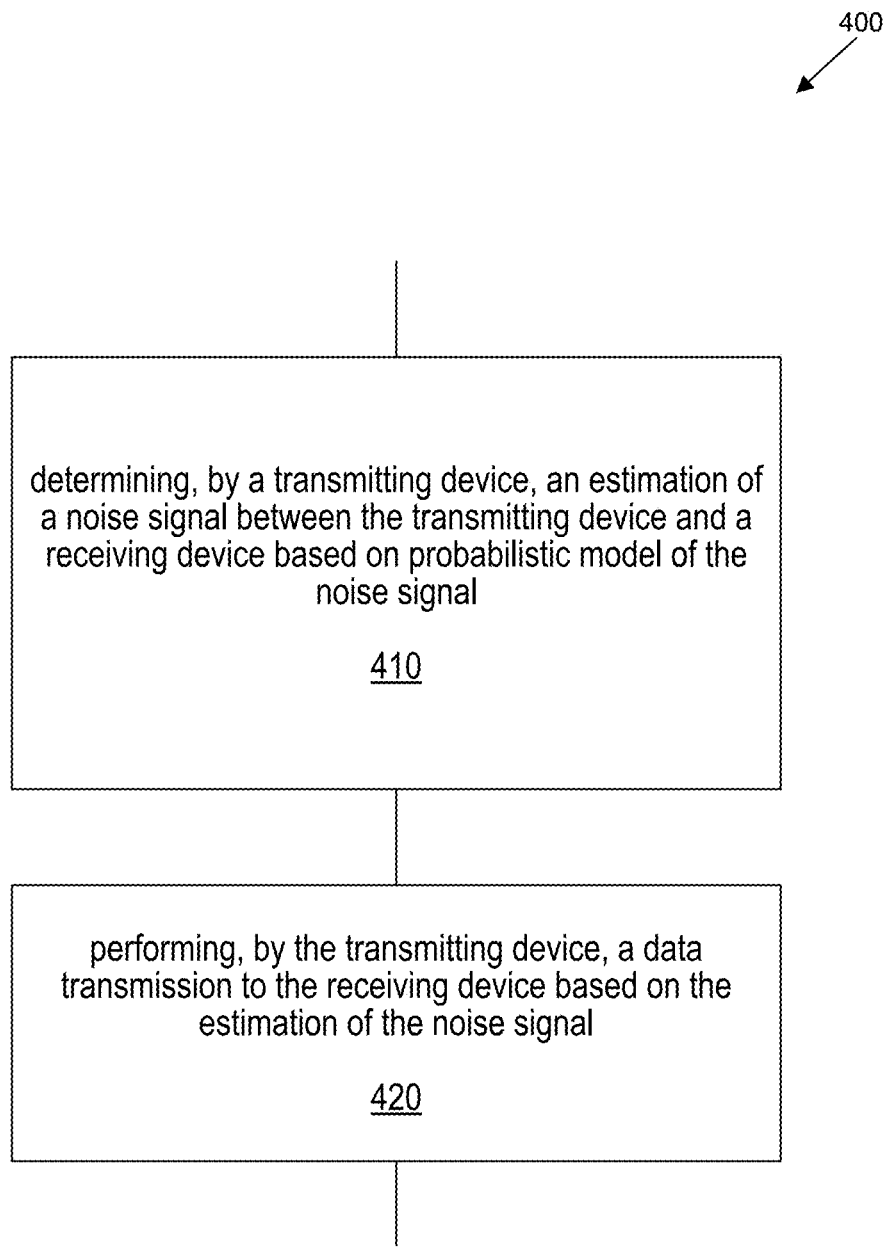
FIG. 4 is a flow chart representation of a method for wireless communication in accordance with one or more embodiments of the present technology.

FIG. 4 is a flowchart representation of a method 400 for wireless communication in accordance with one or more embodiments of the present technology. The method 400 includes, at operation 410, determining, by a transmitting device, an estimation of an interference signal between the transmitting device and a receiving device based on probabilistic model of the interference signal constructed using at least a template associated with a characteristic of the transmitting device or one or more measurements of a channel condition collected within a predefined observation window. The method 400 also includes, at operation 420, performing, by the transmitting device, a data transmission to the receiving device based on the estimation of the interference signal.

In some embodiments, performing the data transmission comprises transmitting, by the transmitting device, an interference elimination signal that has a same amplitude as the estimation of the interference signal. A phase of the interference elimination signal has a 180-degree shift as compared to a phase of the estimation of the interference signal.

In some embodiments, the interference elimination signal is transmitted as a non-payload portion of the data transmission. In some embodiments, the template is determined based on the characteristic of the transmitting device, such as a geographical location of the transmitting device, a landscaping near the geographical location of the transmitting device, or a topology associated with the geographical location of the transmitting device. In some embodiments, the predefined observation window is represented as a number of days, weeks, or months.

It is appreciated that, the techniques disclosed herein can be used to enable dynamical modeling of interference signals based on geometric characteristics and/or channel conditions, thereby allowing more accurate elimination of the undesired interference is communication systems.

Computer System

Figure 5:
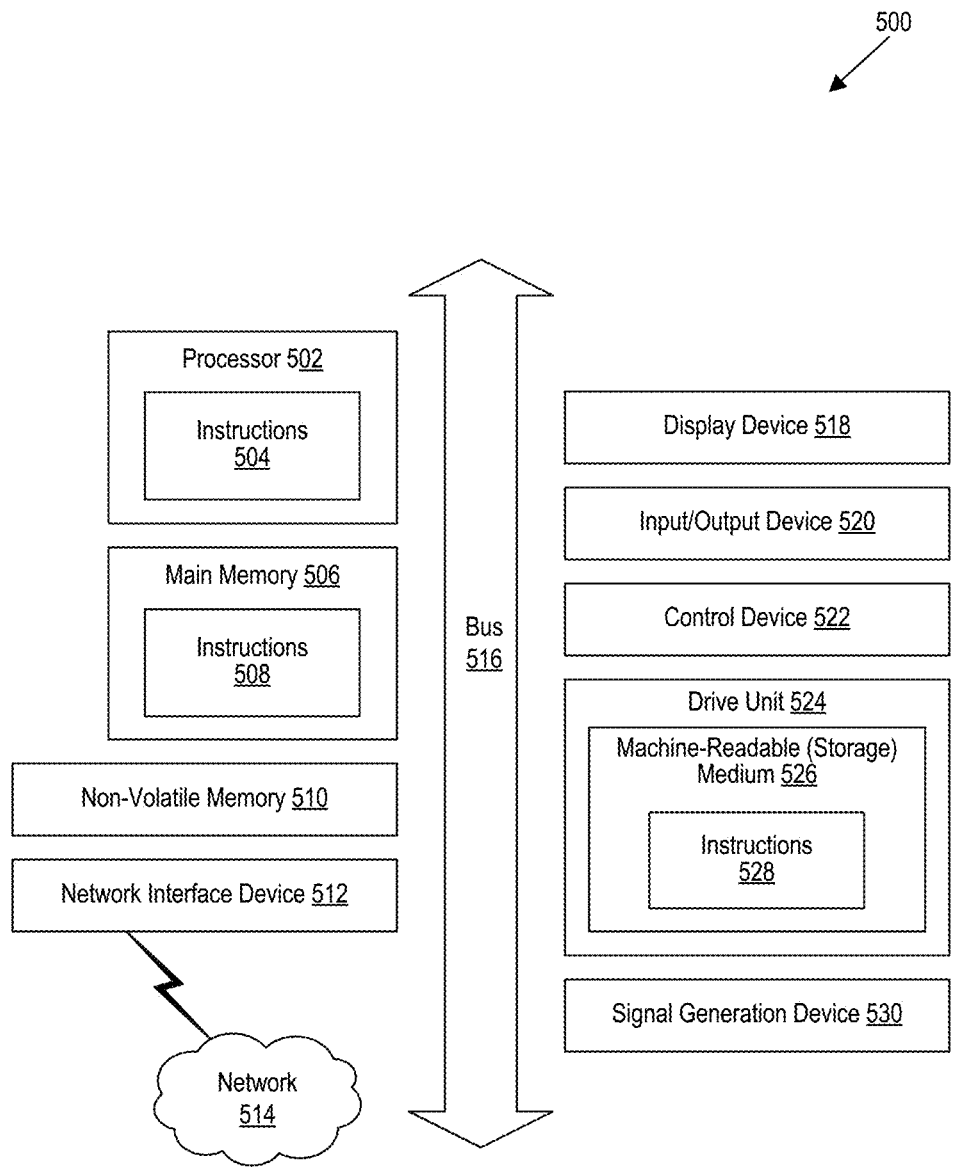
FIG. 5 is a block diagram that illustrates an example of a computer system in which at least some operations described herein can be implemented.

FIG. 5 is a block diagram that illustrates an example of a computer system 500 in which at least some operations described herein can be implemented. As shown, the computer system 500 can include: one or more processors 502, main memory 506, non-volatile memory 510, a network interface device 512, video display device 518, an input/output device 520, a control device 522 (e.g., keyboard and pointing device), a drive unit 524 that includes a storage medium 526, and a signal generation device 530 that are communicatively connected to a bus 516. The bus 516 represents one or more physical buses and/or point-to-point connections that are connected by appropriate bridges, adapters, or controllers. Various common components (e.g., cache memory) are omitted for brevity. Instead, the computer system 500 is intended to illustrate a hardware device on which components illustrated or described relative to the examples of the figures and any other components described in this specification can be implemented.

The computer system 500 can take any suitable physical form. For example, the computing system 500 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 500. In some implementation, the computer system 500 can be an embedded computer system, a system-on-chip (SOC), a single-board computer system (SBC) or a distributed system such as a mesh of computer systems or include one or more cloud components in one or more networks. Where appropriate, one or more computer systems 700 can perform operations in real-time, near real-time, or in batch mode.

The network interface device 512 enables the computing system 500 to mediate data in a network 514 with an entity that is external to the computing system 500 through any communication protocol supported by the computing system 500 and the external entity. Examples of the network interface device 512 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 506, non-volatile memory 510, machine-readable medium 526) can be local, remote, or distributed. Although shown as a single medium, the machine-readable medium 526 can include multiple media (e.g., a centralized/distributed database and/or associated caches and servers) that store one or more sets of instructions 528. The machine-readable (storage) medium 526 can include any medium that is capable of storing, encoding, or carrying a set of instructions for execution by the computing system 500. The machine-readable medium 526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 910, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 504, 508, 928) set at various times in various memory and storage devices in computing device(s). When read and executed by the processor 502, the instruction(s) cause the computing system 500 to perform operations to execute elements involving the various aspects of the disclosure.

Remarks

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

I claim:

1. A method for wireless communication, comprising:
   transmitting, by a communication device to a network node, a measurement result associated with a channel between the network node and the communication device to enable an estimation of an interference signal based on a probabilistic model that is constructed using at least the measurement result;

determining, by the communication device, an interference elimination signal that has a substantially same amplitude as the estimated interference signal and a substantially opposite phase as compared to the estimated interference signal,
  wherein the determining of the interference elimination signal comprises:
    receiving, by the communication device, an indication of the interference elimination signal from the network node,
      wherein the interference elimination signal is determined by the network node based on the probabilistic model; and
  applying, by the communication device, the interference elimination signal to a data transmission to the network node.

2. The method of claim 1, wherein the indication is carried in a control signal in a control channel that corresponds to a data channel for the data transmission.

3. The method of claim 1, wherein the determining of the interference elimination signal comprises:
  deriving, by the communication device, the interference elimination signal based on a geographical location of the communication device.

4. The method of claim 3, wherein the interference elimination signal is derived based on an interference template associated with a characteristic of the geographical location of the communication device, the characteristic comprising a landscape near the geographical location or a topology associated with the geographical location.

5. The method of claim 4, further comprising:
  refining, by the communication device, the interference template based on at least the measurement result collected in a predefined time window.

6. The method of claim 1, wherein the measurement result comprises at least one of: a Channel Quality Indicator (CQI), a Precoding Matrix Index (PMI), or Rank Indicator (RI).

7. The method of claim 1, wherein the measurement result is transmitted within a time window that is represented in a number of hours, days, weeks, months, or quarters.

8. The method of claim 7, wherein the time window is adjustable based on processing load of the network node.

9. The method of claim 1, wherein the probabilistic model comprises at least one of a closest pattern matching (CPM) model or a correlation distortion model.

10. A device for wireless communication, comprising one or more processors that are configured to perform operations comprising:
  transmitting, to a network node, a measurement result associated with a channel between the network node and the device to enable an estimation of an interference signal based on a probabilistic model that is constructed using at least the measurement result;
  receiving an indication of an interference elimination signal from the network node,
    wherein the interference elimination signal is determined by the network node based on the probabilistic model;
  determining the interference elimination signal that has a substantially same amplitude as the estimated interference signal and a substantially opposite phase as compared to the estimated interference signal; and
  applying the interference elimination signal to a transmission to the network node.

11. The device of claim 10, wherein the indication is carried in control information that corresponds to the transmission.

12. The device of claim 10, wherein the operations comprise:
  deriving the interference elimination signal based on a geographical location of the device.

13. The device of claim 12, wherein the interference elimination signal is derived based on an interference template associated with a characteristic of the geographical location of the device, the characteristic comprising a landscape near the geographical location or a topology associated with the geographical location.

14. The device of claim 13, wherein the operations further comprise:
  refining the interference template based on at least the measurement result collected in a predefined time window.

15. The device of claim 10, wherein the measurement result comprising at least one of a Channel Quality Indicator (CQI), a Precoding Matrix Index (PMI), or Rank Indicator (RI).

16. The device of claim 10, wherein the measurement result is transmitted within a time window that is represented in a number of hours, days, weeks, months, or quarters.

17. The device of claim 16, wherein the time window is adjustable based on processing load of the network node.

18. The device of claim 10, wherein the probabilistic model comprises at least one of a closest pattern matching (CPM) model or a correlation distortion model.

* * * * *